Figure 1:
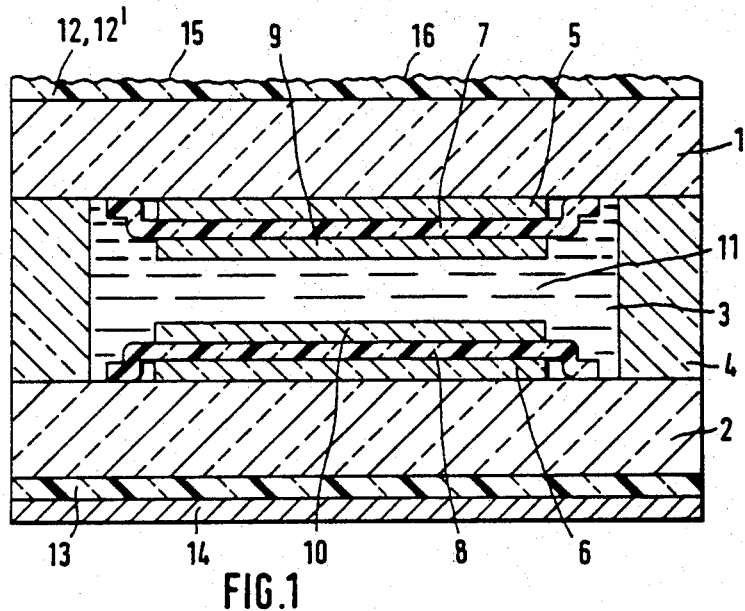

United States Patent [19]

Caramel

[11] Patent Number: 4,488,786

[45] Date of Patent: Dec. 18, 1984

[54] ELECTRO-OPTICAL DISPLAY ELEMENT FOR PREVENTING SPECULAR REFLECTION OF INCIDENT LIGHT

[75] Inventor: Rudolf Caramel, Hofheim, Fed. Rep. of Germany

[73] Assignee: VDO Adolf Schindling AG, Frankfurt am Main, Fed. Rep. of Germany

[21] Appl. No.: 258,985

[22] Filed: Apr. 30, 1981

[30] Foreign Application Priority Data

May 8, 1980 [DE] Fed. Rep. of Germany ....... 3017551

[51] Int. Cl.³ .............................................. G02F 1/135
[52] U.S. Cl. ................................ 350/337; 350/339 D; 350/399
[58] Field of Search ............... 350/337, 338, 352, 370, 350/399

[56] References Cited

U.S. PATENT DOCUMENTS

| | | | |
|---|---|---|---|
| 3,709,580 | 1/1973 | Fugitt et al. | 350/339 |
| 3,806,227 | 4/1974 | Greubel et al. | 350/337 |
| 4,106,859 | 8/1978 | Doriguzzi et al. | 350/338 |
| 4,264,147 | 4/1981 | Baur et al. | 350/338 |

OTHER PUBLICATIONS

Haas, "Display Systems Using Scattering Polarizers" Xerox Disclosure Journal, vol. 3 No. 1 Jan./Feb. 1978 p. 57.
Polaroid Corp., *Polarized Light* U.S.A.

Primary Examiner—John K. Corbin
Assistant Examiner—David Lewis
Attorney, Agent, or Firm—Martin A. Farber

[57] ABSTRACT

A passive electro-optical display element for the representation of information, having two glass plates spaced apart from each other and forming a chamber therebetween, on the chamber side of each plate there being provided a transparent electrode support and the chamber being filled with a liquid-crystal substance, while polarizers are arranged on the outer surfaces of the plates. The surface of the polarizer on the viewing side of the display element facing the observer and away from the glass plate is formed with a plurality of depressions of irregular structure. A reflector is disposed on the polarizer at the opposite side of the display element.

4 Claims, 2 Drawing Figures

U.S. Patent     Dec. 18, 1984     4,488,786

ELECTRO-OPTICAL DISPLAY ELEMENT FOR PREVENTING SPECULAR REFLECTION OF INCIDENT LIGHT

The present invention relates to a passive electrooptical display element for the representation of information, having two glass plates spaced apart from each other and forming a chamber between each other, on the chamber side of each plate there being provided a transparent electrode support and the chamber being filled with a liquid-crystal substance while polarizers are arranged on the outer surfaces of said plates.

In such known display elements there is the disadvantage that the polarizer which is on the side of the viewer may produce specular reflection, such that the reading of the display is no longer possible. This is particularly disadvantageous if the display is mounted in fixed position and cannot be brought into a position in which the reflection is not directed towards the viewer.

In order to avoid such reflection the polarizer facing the viewer has already been made convex. In addition to the larger amount of space required the method of manufacturing such a polarizer, however, is complicated and expensive.

The object of the invention is therefore to provide a display element of the aforementioned type which is developed so as to avoid reflection in simple manner without additional components.

This object is achieved in accordance with the invention in the manner that the polarizer (12, 12') on the viewing side (15) of the display element is provided on the surface of the polarizer facing away from the glass plate (1) with a plurality of depressions (16) of irregular structure and a reflector is disposed on the polarizer at the opposite side of the display element. By this irregular structure there is produced a scattering of the light reflected by the polarizer, as a result of which the reading of the display element can no longer be impaired by specular reflection.

Since a part of the display element which is already present is used for the elimination of reflection and this part is furthermore not changed in its structural thickness, elimination of specular reflection is obtained in an advantageous manner without additional structural parts components and without increasing the structural thickness of the display element.

The depressions (16) can have both an approximately semi-spherical cross section and an approximately pyramidal cross section.

The depressions may be suitably produced by an embossing process. In this connection an embossing die (18, 18') may be a hard-metal plate which is provided with elevations (20) corresponding to the depressions (16) and by which the polarizer (12, 12') can be pressed against a counter plate (17, 17'). Another possibility resides in the embossing die being a rotatable embossing roller provided with elevations corresponding to the depressions, between which roller and a counter-roller, also rotatable, arranged parallel thereto, the polarizer can be passed.

In both processes the pressure with which the polarizer is pressed by the embossing die against a counter plate or by the embossing roller against a counter roller must be so high and the entire process last so long that plastic deformation of the polarizer is definitely effected.

The elevations of the embossing die can be produced, for instance, by etching or sandblasting. In the sandblasting process either spherical sandblast material or sharp-edged sandblast material can be used, the former resulting in more semi-spherically shaped depressions on the polarizer and the latter in more pyramidally shaped depressions.

One material which is particularly suitable for the embossing die in view of its strength is brass. In order both to increase the life of the embossing die and to avoid chemical attack on the embossing die by the material of which the polarizer consists, the surface of the embossing die which bears the elevations may be surface-treated, it being advantageous for the surface bearing the elevations to be chrome-plated.

In order to be able to reduce the pressure and the time required in the embossing process, the embossing process can be a thermoplastic process. For this purpose a heating element (19) can advantageously be arranged on the side of the embossing die (18, 18') which faces away from the polarizer (12, 12'), said heating element heating the polarizer during the embossing process.

The embossed polarizers can be produced in a particularly economic fashion by effecting the embossing by pressing together a block of one or more packs stacked alongside of each other comprising counter plate (17, 17'), polarizer (12, 12'), embossing die (18, 18') and heating element (19). In this way several polarizers can be produced simultaneously in one embossing process.

Figure 2:
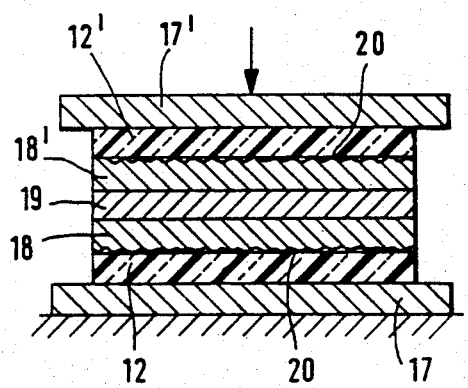

FIG. 1 is an embodiment of a display element in accordance with the invention shown in cross section and FIG. 2 shows the construction of a die for the production of the depressions in the polarizers.

The electrooptical display element shown in FIG. 1 has two glass plates 1 and 2 spaced apart from each other and forming a chamber 3 between each other. This chamber 3 is closed laterally by a closure part 4.

On the chamber side, transparent electrode supports 5 and 6 are applied to the glass plates 1 and 2, an insulating layer 7 and 8 and an orientation layer 9 and 10 being arranged on said supports.

The chamber 3 is filled with a liquid-crystal substance 11.

Polarizers 12 and 13 are arranged on the outer surfaces of the glass plates 1 and 2, the polarizer 13 which is remote from the viewing side 15 of the display element furthermore having a reflector 14 disposed thereon.

The polarizer 12 is provided with a plurality of depressions 16 of irregular structure.

By these depressions 16 the light impinging from the viewing side 15 onto the polarizer 12 is reflected with strong scattering so that there is no specular reflection.

FIG. 2 shows the construction of a die for producing the depressions 16 in the polarizers 12 and 12'. A polarizer 12 is arranged on a first counterplate 17, a first embossing die 18 lying against the polarizer. On top of the embossing die 18 there is arranged a heating element 19 and then another embossing die 18', the second polarizer 12' and a second counterplate 17'.

The embossing dies 18 and 18', which preferably consist of brass, have a plurality of small elevations 20 on the surfaces thereof facing the polarizers 12 and 12', said elevations corresponding to the depressions subsequently present in the embossed polarizer, as shown in FIG. 1.

At least on the surfaces provided with the elevations 20, the embossing dies 18 and 18' are chromeplated in order to increase their life.

The elevations 20 are produced, for instance, by the sandblasting or etching of the embossing dies 18 and 18'.

During the embossing, the counterplate 17 is acted on by pressure and the entire pack consisting of counterplate 17, polarizers 12 and 12', embossing dies 18 and 18' and heating element 19 is pressed together. In this way the structure of the elevations 20 of the embossing dies 18 and 18' is impressed into the polarizers 12 and 12' so that the polarizers 12 and 12' are thus provided with the depressions 16. In order for this deformation to take place plastically, the polarizers 12 and 12' are heated by the heating element 19 during the embossing, whereby the value of the compressing pressure and the duration of the pressing can be kept relatively low.

It is self-evident that if several such packets are provided, as shown in FIG. 2, the polarizers can be manufactured with even greater economy.

While there has been disclosed embodiments of the invention, it is to be understood that these embodiments are given by example only and not in a limiting sense.

I claim:

1. A passive electro-optical display element for the representation of information, having two glass plates spaced apart from each other and forming a chamber therebetween, on the chamber side of each plate there being provided a transparent electrode support and the chamber being filled with a liquid-crystal substance, and wherein polarizers are disposed on the outer surfaces of said plates respectively, the improvement wherein
   one of the polarizers on a viewing side of the display element has a front surface facing away from the corresponding glass plate, said front surface being formed with a plurality of depressions of irregular structure for scattering light incident upon said front surface from said viewing side to prevent specular reflection of such light, and wherein
   a reflecter is disposed on the other polarizer at the side remote from the viewing side of the display element.

2. The display element according to claim 1 wherein said depressions have a substantially semi-spherical cross-section.

3. The display element according to claim 1 wherein said depressions have a substantially pyramidal cross-section.

4. The display element according to claim 1 wherein said depressions are embossed.

* * * * *